United States Patent [19]

Teurlings

[11] Patent Number: 5,088,637
[45] Date of Patent: Feb. 18, 1992

[54] METHOD OF, AND APPARATUS FOR, BREAKING AN OPTICAL FIBER

[75] Inventor: Lucas G. C. Teurlings, 's-Hertogenbosch, Netherlands

[73] Assignee: AMP Incorporated, Harrisburg, Pa.

[21] Appl. No.: 528,309

[22] Filed: May 24, 1990

[30] Foreign Application Priority Data

Sep. 27, 1988 [GB] United Kingdom ............... 8822619
Aug. 16, 1989 [WO] PCT Int'l Appl. ...PCT/US89/03461

[51] Int. Cl.$^5$ .............................................. G02B 6/25
[52] U.S. Cl. ...................................... 225/1; 225/96.5; 225/103
[58] Field of Search .................... 225/1, 2, 96.5, 96, 225/103

[56] References Cited

U.S. PATENT DOCUMENTS

| | | | |
|---|---|---|---|
| 3,934,773 | 1/1976 | Chinnock et al. | 225/96.5 X |
| 4,017,013 | 4/1977 | Hawk et al. | 225/96.5 |
| 4,322,025 | 3/1982 | Johnson | 225/96.5 |
| 4,456,159 | 6/1984 | Roberts | 225/96.5 |
| 4,474,319 | 10/1984 | Walker | 225/96.5 |
| 4,502,620 | 3/1985 | Leiby | 225/2 |
| 4,565,310 | 1/1986 | Krause | 225/96.5 X |
| 4,662,710 | 5/1987 | ten Berge | 350/96.10 |
| 4,785,701 | 11/1988 | ten Berge et al. | 225/96 X |
| 4,976,390 | 12/1990 | Gee et al. | 225/96 |

FOREIGN PATENT DOCUMENTS

2168641 6/1986 United Kingdom .

*Primary Examiner*—Frank T. Yost
*Assistant Examiner*—Rinaldi Rada
*Attorney, Agent, or Firm*—Thomas G. Terrell; Bruce J. Wolstoncroft

[57] ABSTRACT

Apparatus for breaking an optical fiber comprises fiber gripping units (2 and 4) each comprising a rigid block (6 or 6') having adhered thereto a strip (8 or 8') of a resilient material, for example a synthetic felt, the blocks (6 and 6') being relatively movable between an open position to receive an optical fiber (OF) between the resilient strips (8 and 8') and a closed position to clamp the fiber (OF) between the strips (8 and 8'). A fiber holder (9) is provided for applying a pulling force (P1) to the fiber (OF) to cause it to slide between the resilient strips (8 and 8') in the closed position of the blocks (6 and 6') Before being inserted between the strips (8 and 8'), the fiber is formed with a V-shaped notch (N) at which the fiber is to be broken. The strips (8 and 8'), are so configured that as the fiber (OF) slides between the strips (8 and 8') it is first bent about the notch (N), after which the direction of bending of the fiber (OF) is reversed so that fiber (OF) is broken at the notch (N) under the pulling force (P1) applied to the fiber (OF) by the fiber holder (9). The one severed end face of the fiber (OF) is then pulled away from the other (8 and 8') by the fiber holder 9.

19 Claims, 10 Drawing Sheets

METHOD OF, AND APPARATUS FOR, BREAKING AN OPTICAL FIBER

This invention relates to a method of, and apparatus for, breaking an optical fiber.

There is disclosed in U.S. Pat. No. 4,662,710, a method of breaking an optical fiber, in which method an optical fiber having a notch formed therein, is positioned between confronting surfaces of first and second resilient members with the notch between those surfaces and a compressive force is applied to the resilient members to bend the fiber about the notch in a first sense and the fiber is placed under tension, to break the fiber at the notch at a break location between said surfaces.

In the method described in the patent specification mentioned above, the resilient members are in the form of rectangular cross-section rubber strips, one of said confronting surfaces being rectilinear, the other of these surfaces being bowed towards the rectilinear surface. Under the compressive force, both a bending load and a tensile load are applied to the notched part of the fiber to cause a crack to propagate from the notch, so that the fiber breaks. If the notched part of the fiber is correctly stressed, each fractured fiber end surface will be a substantially optically smooth, surface that is to say a surface known in the art as a "mirror" type surface. Such mirror type surfaces do not need to be polished before the fiber end is placed against a similar fiber end to provide a fiber optic splice. For optimum light transmission through the splice, the fracture angle should be in the order of one degree.

It has been found, that in use of the method under discussion, when the fiber breaks, the rubber strips are damaged by sharp edges of the severed faces of the fiber so that irregularities are formed in the confronting surfaces of the rubber strips which may affect the quality of the mirror type surface or fracture angle, or both of these. Also, loose chips of the fiber, for example chips of glass, resulting of the breaking of the fiber, can remain on, or in, the rubber strips and impair the mirror type surface and the fracture angle.

The mirror type surface and the fracture angle are also influenced by the width and thickness tolerances of, and the shape of, the rubber strips and those which are correct in these respects are difficult to obtain. The amount of the rubber of the strips that is compressed, will vary in accordance with the said tolerances and with the shape of the strips, which should be consistently rectangular. Such variations may cause substantial changes in the mirror type surface and the fracture angle, especially when, for example, the rubber strips are exchanged for new ones. When the strips are pressed against one another, under the action of said compressive force, the fiber will be torsioned with resulting increase in the fracture angle, unless the strips are of a strictly rectangular cross section. It appears in practice, that if such rubber strips are used in the method described in U.S. Pat. No. 4,662,710, the extent of the mirror type surface and the fracture angle can be changed simply by the strips shifting in their supporting tooling.

Although the above disadvantages can be minimized by making the strips of a particular kind of silicone rubber, they cannot, in fact, be eliminated.

Also, during compression and decompression of the silicone rubber, when the fiber is broken, small particles of rubber are scraped from the said confronting surfaces by the sharp edges of the broken fiber and these particles remain on the severed end faces of the fiber. During decompression of the rubber strips, said end faces move back towards each other so that the loose particles of rubber are pressed between the end faces and adhere thereto to an extent that they cannot be removed from the end faces simply by the use of adhesive tape. Such contamination of the end faces may result in there being a gap between the end faces of two fibers that have been connected in light transfer relationship by means for example of a crimped splice. Light transmission between the fibers may thus be substantially impaired or even eliminated as a result of the said contamination material, when the core material of the splice, for example, aluminium, is pressed into the center part of the gap during the crimping operation.

According to one aspect of the invention, with a view to mitigating the disadvantages discussed above in a method as defined in the second paragraph of the present specification, a pulling force is applied to the fiber to cause it to slide axially between the resilient members from a start location, during the application of the compressive force, to move the notch to said break location; and upstream of the break location, in the direction of sliding of the fiber, a bending force is applied to the fiber to bend it in a sense about the notch that tends to close it, so that as the notch is moved from the start location to the break location, the sense of curvature of the fiber about the notch is gradually reversed.

By proper choice of the relative values of the compressive and the pulling forces, the stress distribution in the notched part of the fiber, at the break location, can be such that there will be very little, or no mist or hackle on the severed end faces of the fiber because the speed of propagation of the crack in the fiber, from the notch will not exceed the critical velocity of about one third of the speed of sound.

The said end faces of the fiber cannot move back towards one another after the breaking of the fiber because by virtue of the application of said pulling force, these end faces are separated from one another as soon as the fiber has been broken.

Because the fiber is caused to slide between the resilient strips, contortion of the fiber resulting from its being clamped is diminished or avoided so that the fracture angle is desirably small.

The bending force that is applied to the fiber upstream of the break location, may be applied before the pulling force is applied to the fiber so that the fiber is subjected purely to bending load in said second sense and to no tensile loading.

According to an embodiment of the invention, the bending load on the fiber is decreased to zero substantially half way between the starting position of the notch and said break location, as the tensile load gradually increases.

According to another aspect of the invention, apparatus for breaking an optical fiber at a notch formed therein, comprises first and second, resilient strips supported in opposed relationship so as to have confronting surfaces for receiving the fiber between them, and means for applying a compressive force to the strips to bend the fiber in a first sense about the notch, to break the fiber at a break location along the strips. Means are provided for applying a pulling force to the fiber to cause it to slide axially between the strips during the application of the compressive force, to position the notch at the break location, opposed bending surfaces of the strips being provided upstream, in the direction of sliding of the fiber, of the break location, for bending the fiber about said notch at said start location, in a second sense which is opposite to said first sense, during the application of said compressive force, whereby as the notch is moved from the start location to the break location, the sense of curvature of the fiber about the notch is gradually reversed.

The strips are preferably supported by rigid blocks, for example of metal, having confronting surfaces to which the strips are firmly adhered, and being shaped to provided said bending surfaces.

According to one embodiment of the invention, said confronting surfaces of the blocks are so formed, that the confronting surfaces of the strips are of complementary undulating shape, a convex surface of one strip being received in a concave surface of the other strip on one side of the longitudinal centre of the strips and a convex surface of the other strip receiving a concave surface of the one strip on the other side of the longitudinal centre, when a fiber is compressed between the strips.

According to another embodiment of the invention, one strip is supported so as to have a convex surface which is bowed towards the other strip, extending along the full length of the one strip, the other strip having a flat surface extending from a convex surface for bending the fiber in said second sense, in the upstream direction of sliding of the fiber.

The blocks may be supported by a clamping device which is adjustable to move the blocks away from one another for insertion of the fiber between the confronting surfaces of the resilient strips, and towards one another for clamping the fiber between the strips to apply a predetermined compressive force thereto.

The pulling force may be applied by means of a fiber holder for gripping an end of the fiber projecting from between the resilient strips and being movable theretowards to insert an end portion of a fiber gripped by the fiber holder between the strips to an extent limited by a stop, the fiber holder being movable away from the resilient strips to apply a predetermined pulling force to the fiber.

For a better understanding of the invention and to show how it may be carried into effect, reference will now be made by way of example to the accompanying drawings, in which

FIG. 1D is a fragmentary side view of the fiber showing a notch formed therein, at which the fiber is to be broken;

FIGS. 2A to 7A are fragmentary, enlarged sectional views showing the notched part of the fiber and illustrating stress distribution therein at the stages illustrates in FIGS. 2 to 7, respectively;

FIG. 8 is an elevational view illustrating end portions of optical fibers which have been broken by means of the apparatus, arranged in mutually overlapping relationship.

Figure 1:
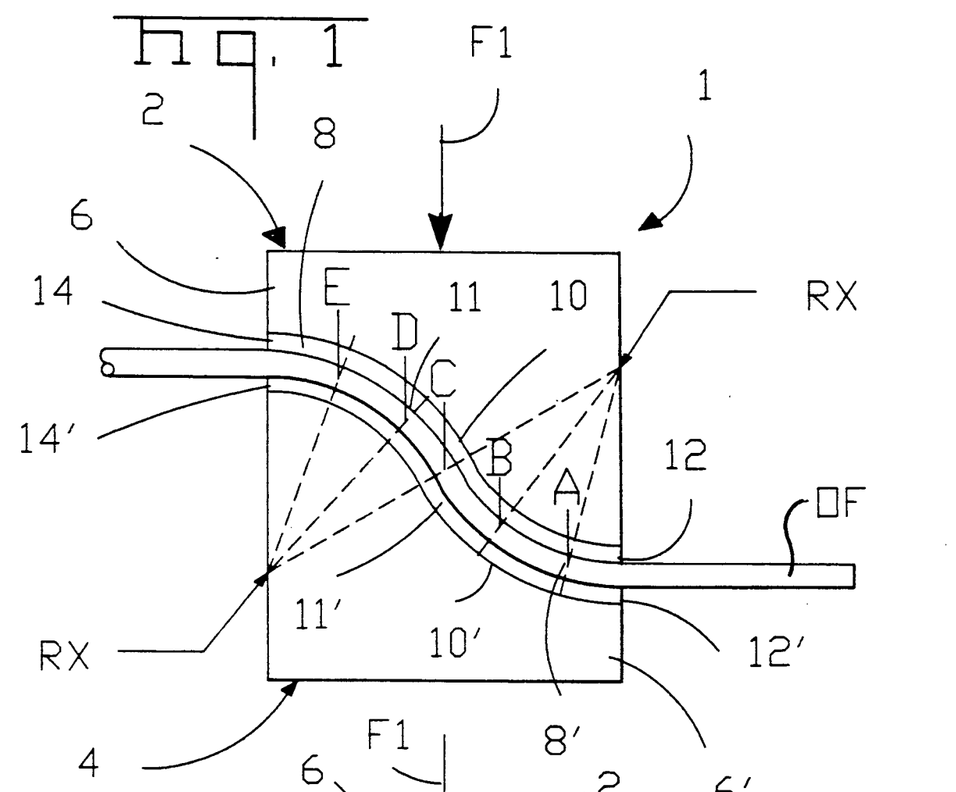
FIG. 1 is a diagramatic side view of a pair of clamping units of apparatus according to a first embodiment of the invention, for breaking an optical fiber.
Figure 1A:
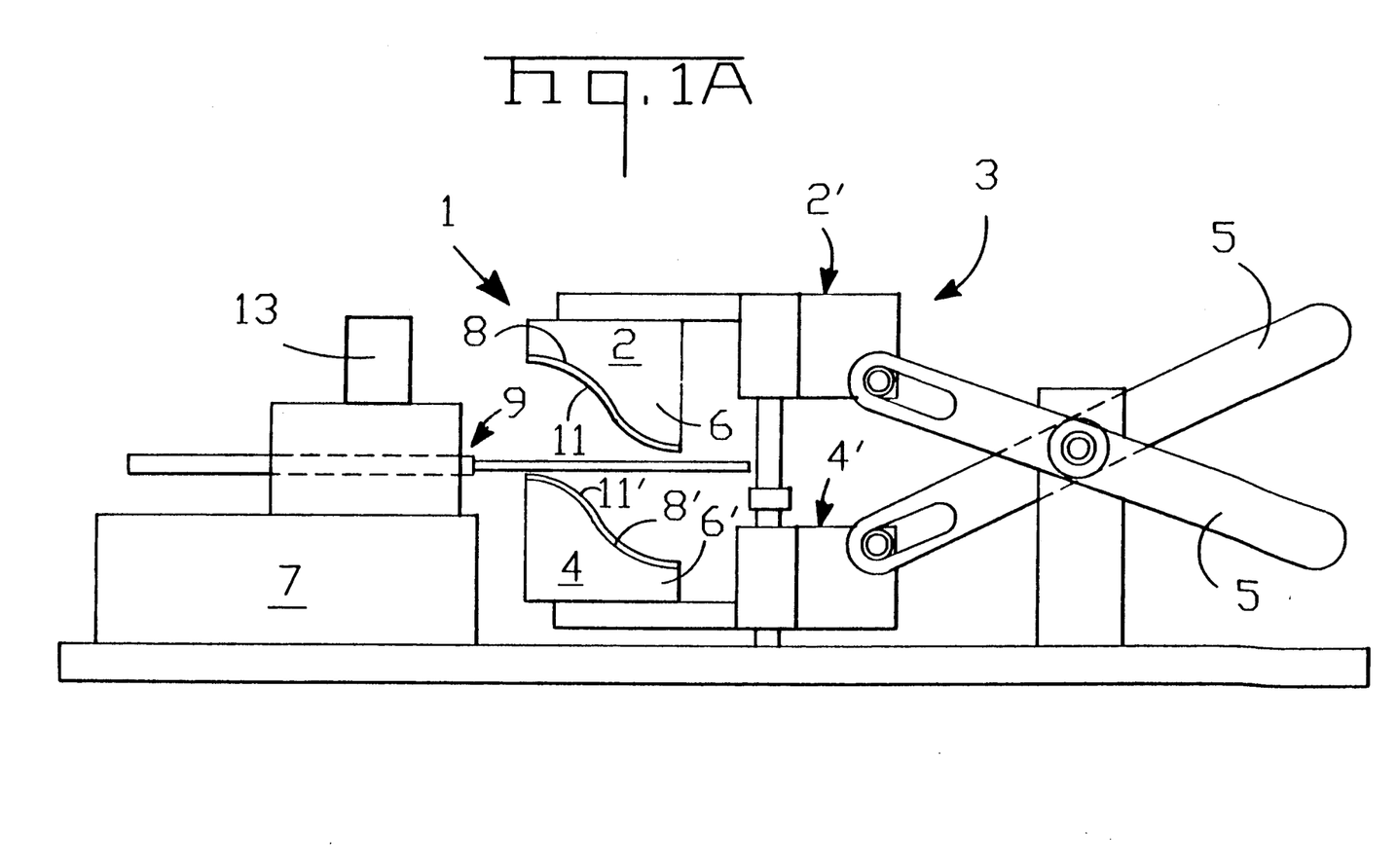
FIG. 1A is a diagramatic side view of the apparatus showing the clamping units in an open position.

As shown in FIG. 1A, apparatus for breaking an optical fiber, comprises a fiber clamp which is generally referenced 1 and which is supported in a clamping frame 3, and a fixed frame 7 supporting a movable fiber holder 9.

The fiber clamp 1 comprises fiber clamping units 2 and 4 respectively, the units 2 and 4 comprising rigid blocks 6 and 6' respectively, made for example of metal. The block 6 and 6' are formed with undulating confronting surfaces 10 and 10' respectively, which are complementary with each other. There are adhered to the surfaces 10 and 10', for example by means of a suitable glue, resilient strips 8 and 8' respectively, made of a non-fraying material, for example a synthetic felt, each strip 8 and 8' following the contour of the respective surface 10 or 10' the strips 8 and 8' having confronting surfaces 11 and 11' respectively. Each strip 8 and 8' having confronting surfaces 11 and 11', by virtue of the serpentine configuration of its supporting surface 10 or 10', has lengths of various radii RX, constantly spaced the points A to E on which, are identified in FIG. 1. The surface 11 is continuously convex from its right hand (as seen in FIG. 1) end 12, through points A and B up to point C, and is reversely contoured, that is to say concave, from point C through points D and E, to its left hand (as seen in FIG. 1) end 14. The surface 11' is continuously concave from its right hand (as seen in FIG. 1) end 12' through points A and B up to point C, and is reversely contoured, that is to say convex, from point C through points D and E to its left hand (as seen in FIG. 1) end 14'. Thus in each case, the curvature of each resilient strip 8 and 8' and thus of its confronting surface 11 or 11' is reversed at point C.

Figure 1B:
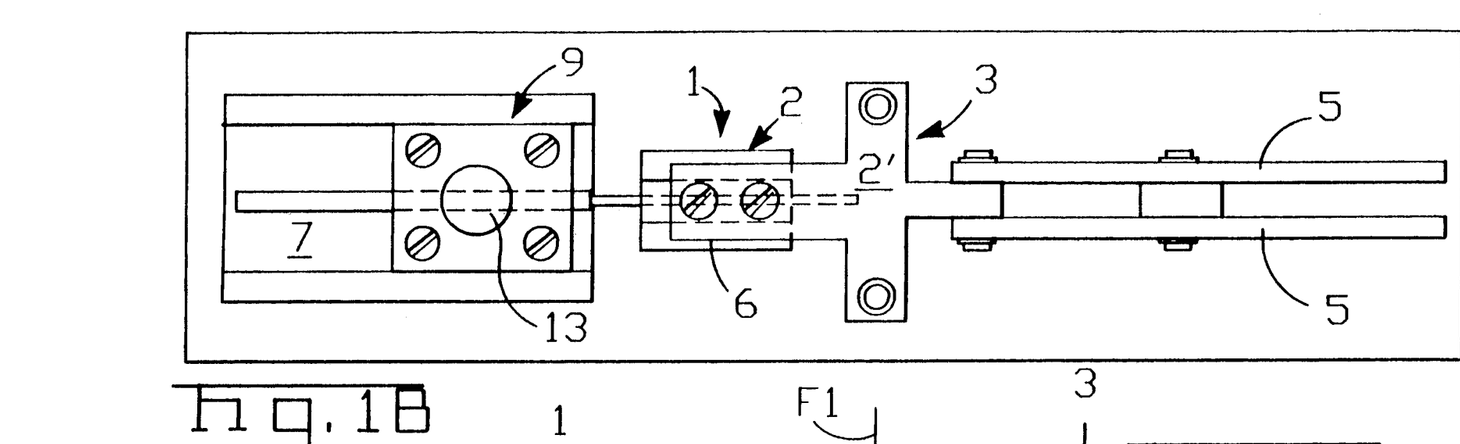
FIG. 1B is a plan view of FIG. 1A.
Figure 1C:
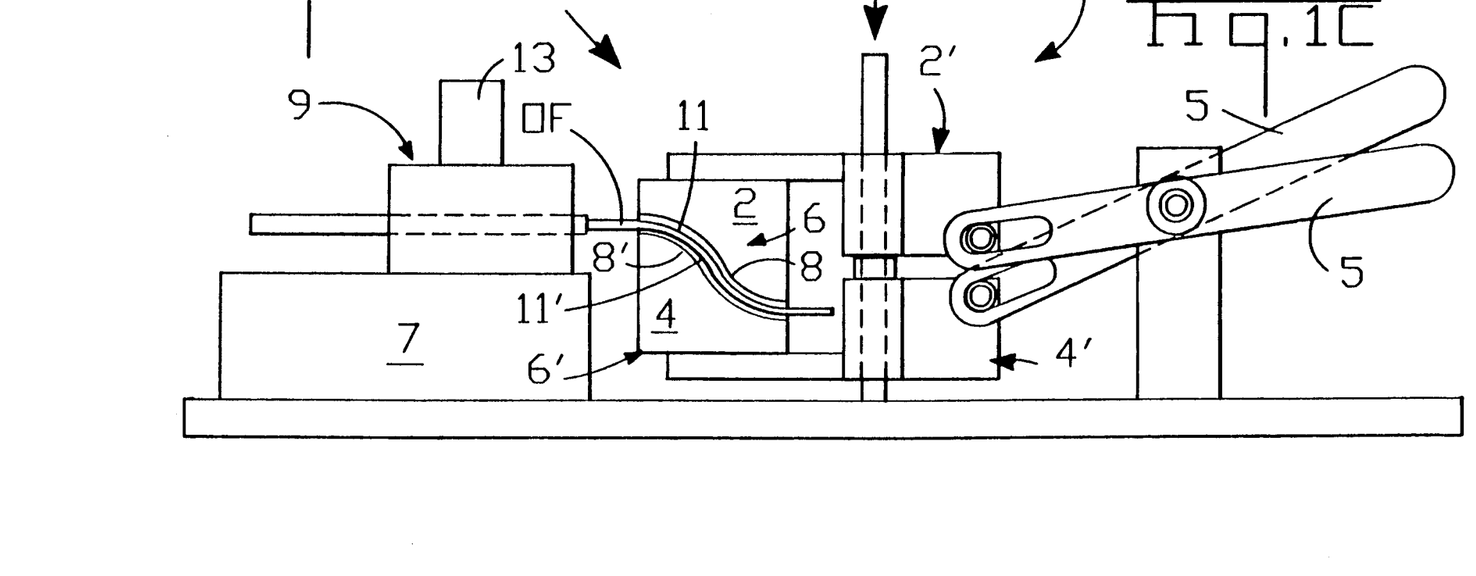
FIG. 1C is a similar view to that of FIG. 1 but showing the clamping units in a closed position.

As shown in FIGS. 1A to 1C, the clamping frame 3 has operating levers 5 for moving support 2' and 4' for units 2 and 4 vertically towards and away from one another between an open position in which an end portion of an optical fiber OF can be inserted between the surfaces 11 and 11' lengthwise of the strips 8 and 8', and a closed fiber clamping position in which the units 2 and 4 are shown in FIG. 1C. The levers 5 can be operated, to apply a predetermined clamping force F1 to said end portion of the fiber OF. The frame 7 has an operating handle 13 for moving the fiber holder 9 towards and away from the fiber clamp.

Figures 1D, 3A, 4A:
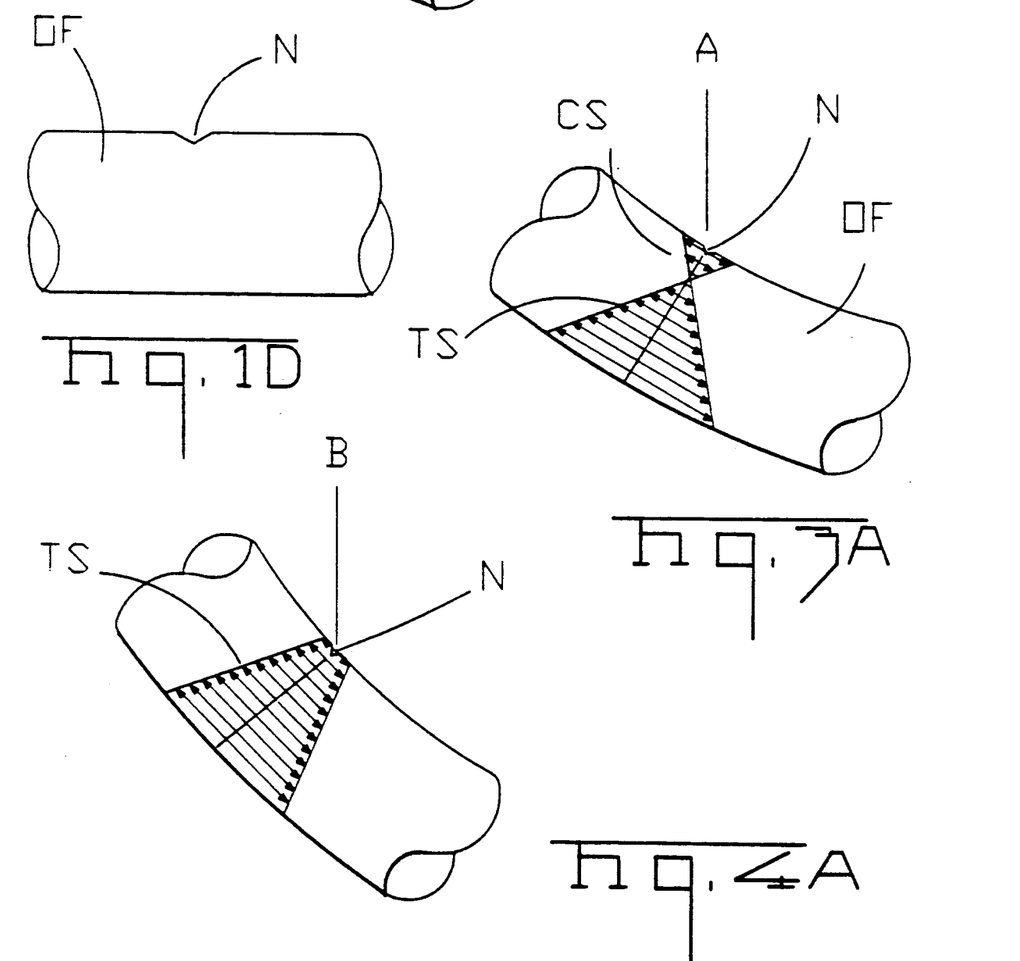
Figure 2:
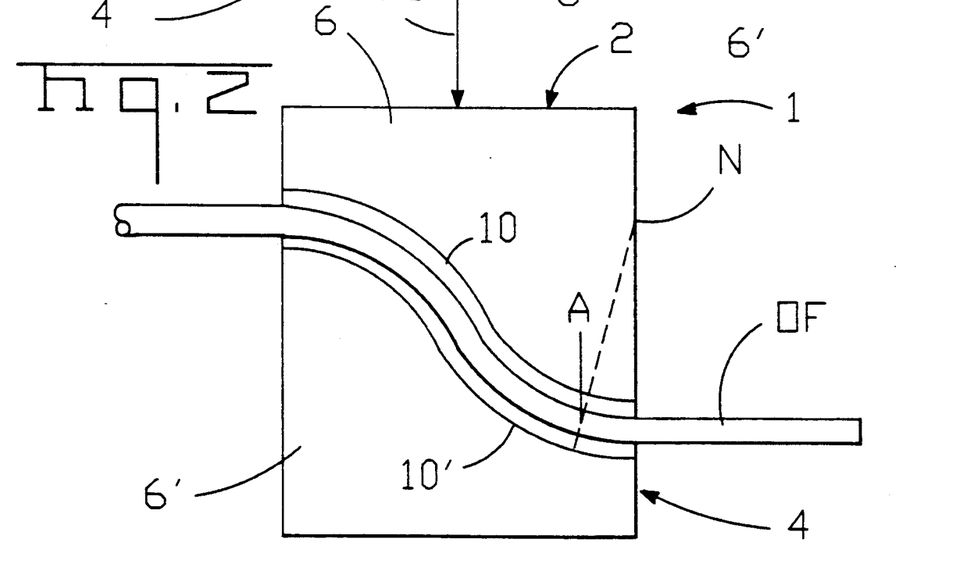
FIGS. 2 to 7 are diagramatic views similar to that of FIG. 1 illustrating successive stages in a method of breaking the optical fiber by means of the apparatus.
Figure 2A:
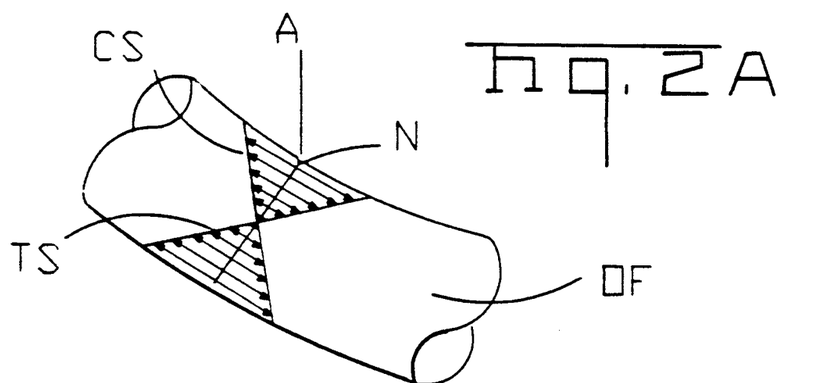
Figure 3:
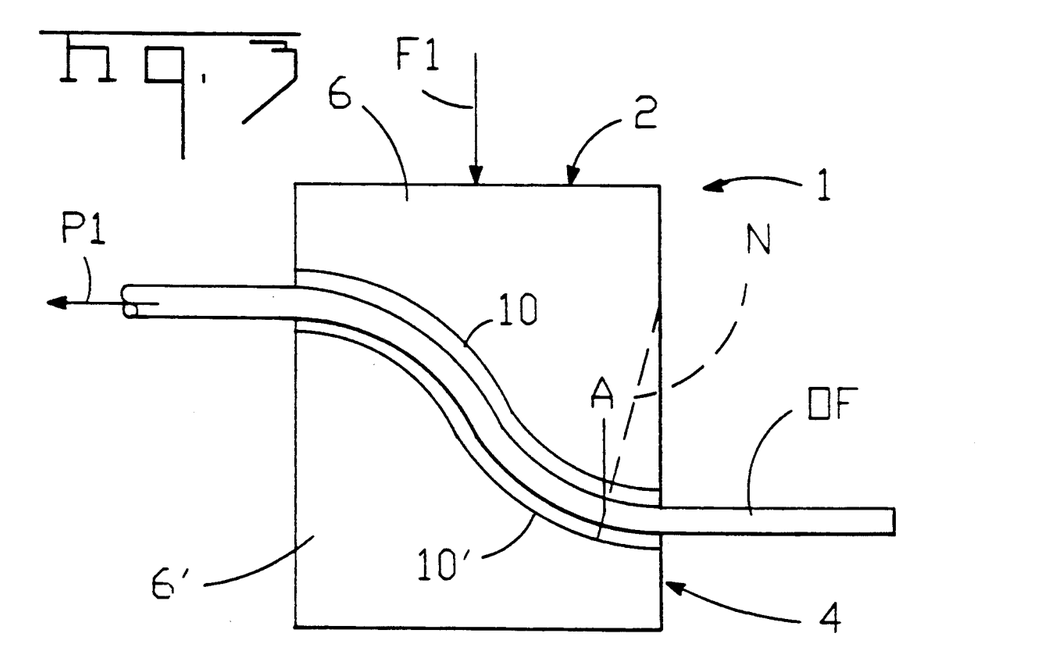
Figure 4:
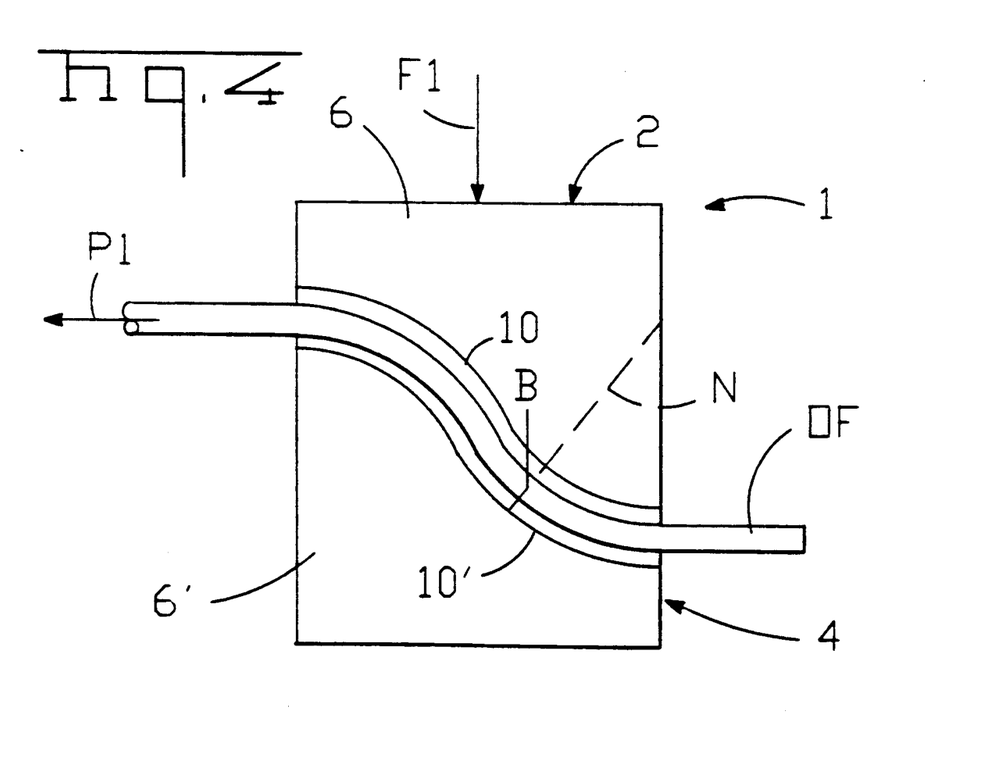

For use with the apparatus, said end portion of the fiber OF has formed, therein, for example by scribing or etching, a sharp, V-shaped notch N, which is best seen in FIG. 1D, to provide a weakened zone at which the fiber end portion can be broken, as described below. The fiber OF with the notch N formed therein, is passed through fiber holder 9 which is then actuated securely to grip the length of fiber OF extending therethrough, and the fiber holder 9 is advanced by means of the handle 13, from a retracted position (not shown), to pass the end portion of the fiber between the surfaces 11 and 11', with the units 2 and 4 in an open position (FIGS. 1A and 1B), to position the notch N at point A as shown in FIG. 2. In FIGS. 2 to 7, the position of the notch N is indicated by a broken line N and in FIGS. 2A to 7A by a full line N. Upon closure of the units 2 and 4 (FIG. 1C), the force F1 is applied to compress the fiber portion betweem the surfaces 11 and 11'. The notched part of the fiber end portion is, therefore, subjected to pure bending load as will be apparent from the stress distribution indicated by compressive stress lines CS and tensile stress lines TS in FIG. 2A. The configuration of the strips 8 and 8', at point A is such that said bending load is applied to bend the fiber about the notch N, which is uppermost, a sense which tends to close the notch N. No breaking action therefore occurs at point A. The fiber holder 9 is now retracted by means of the handle 13 to apply a predetermined pulling force P1 (FIG. 3) to pull the fiber OF in a left hand (as seen in FIG. 3) direction, so that it slides axially between the surface 11 and 11', whereby the notch N is shifted from its start location, namely point A, through points B, C and D, to point E as shown in FIGS. 4 to 7.

Figure 5:
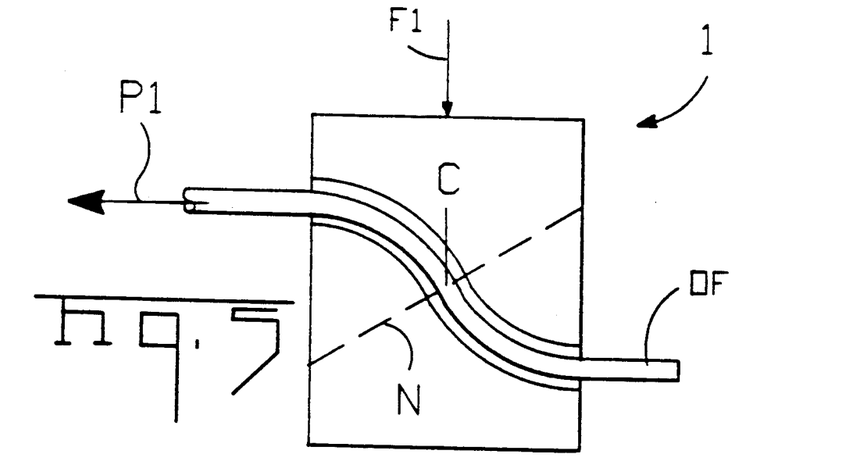
Figures 5A, 6A, 7A, 8:
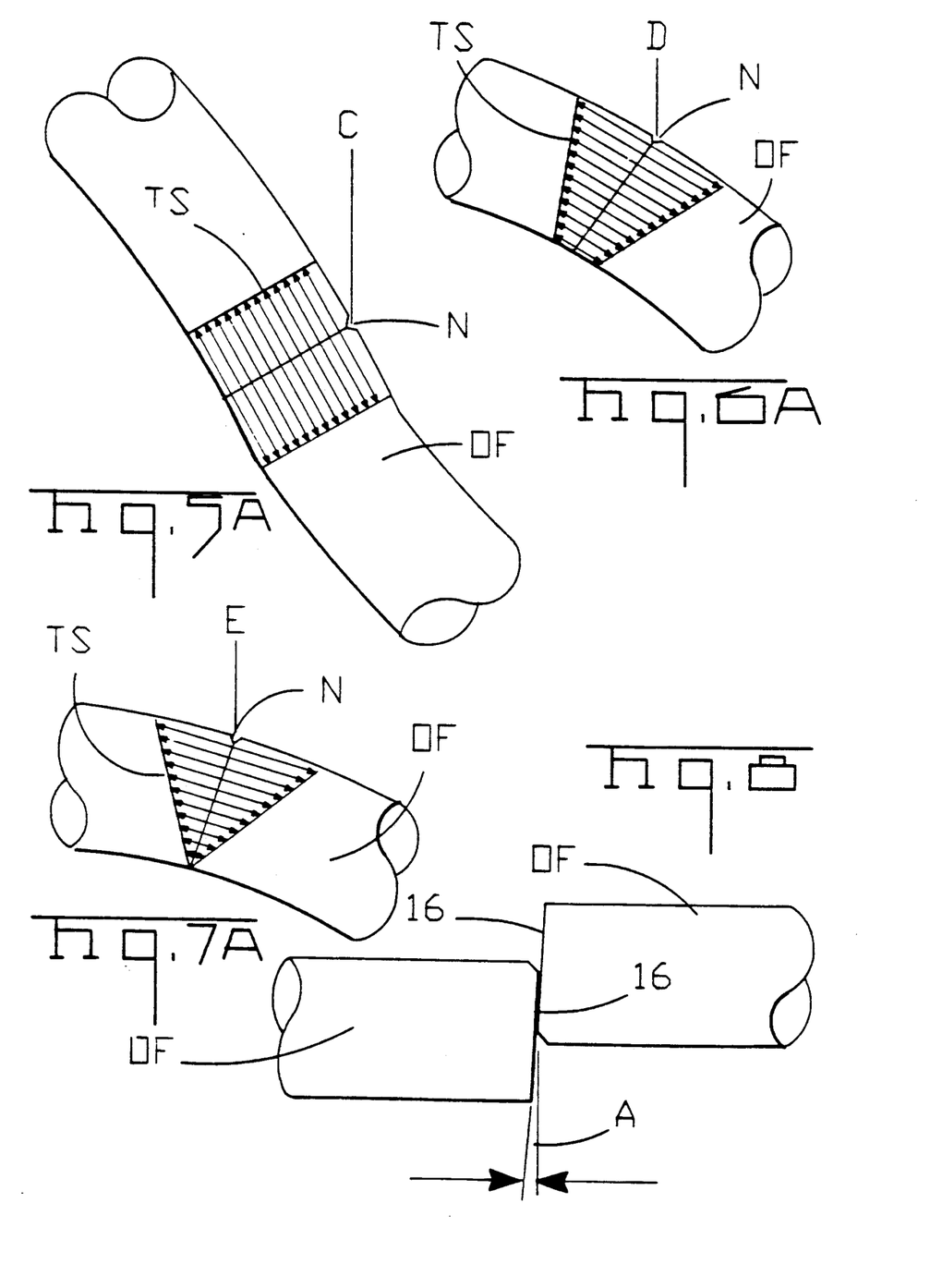
Figure 6:
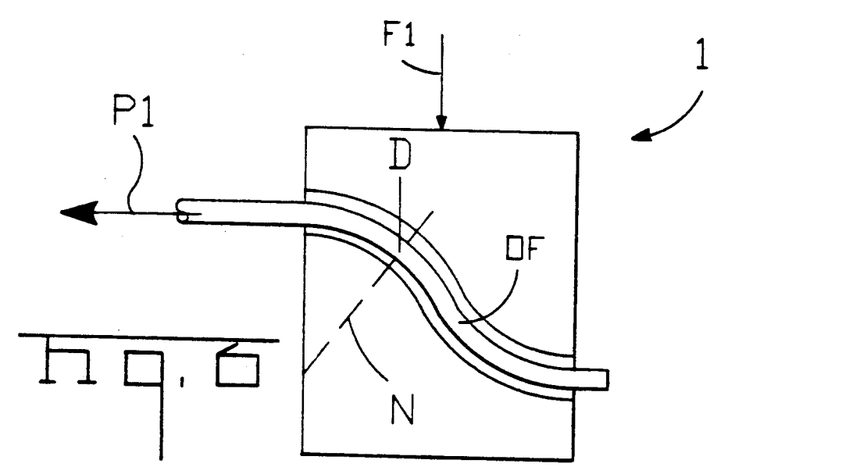
Figure 7:
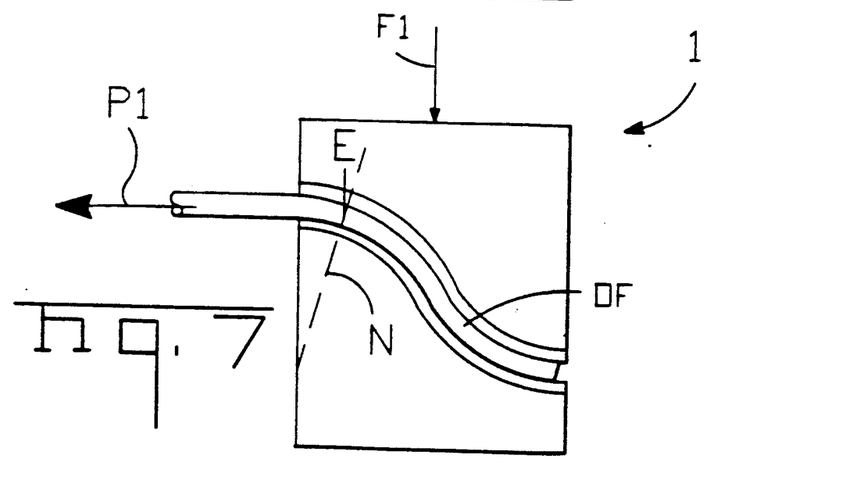

When the force P1 is applied, with the notch at point A, the fiber begins to move, the stress distribution in the fiber, in the vicinity of the notch N, results mainly from the bending load, and to a small extent from the tensile load, applied to the fiber as indicated in FIG. 3A. As the fiber continues to slide between the surfaces 11 and 11', and the notch N is moved from point A to point B, the bending load gradually decreases and the tensile load gradually increases (FIG. 4A). By the time the notch N has reached point C, i.e. the reversal point of the arcs of the surfaces of 11 and 11', the bending load has decreased to zero and the stress distribution at point C is due to pure tensile load (FIGS. 5 and 5A) which gradually increased as the notch N was moved from point B to point C. As the notch N is moved from point C to point D the bending load on the notched part of the fiber is reversed, so that said part of the fiber is bent gradually in a direction to break the fiber at the notch N. At this time the tensile load on the fiber also gradually increases (FIGS. 6 and 6A). As the notch N moves from point D to point E, the bending and the tensile loads in the notched part of the fiber gradually increase so as to be in correct relation to each other at point E where the fiber breaks, the stress distribution being such that there is minimal local stress at a given break strength (FIGS. 7 and 7A), whereby the speed at which a crack is propagated through the fiber from the N, as the fiber breaks, does not exceed a critical velocity of about one third of the speed of sound. As the fiber breaks, the severed end of the length of fiber gripped by the fiber holder 9, is pulled away from the severed end of the fiber end portion between the surfaces 11 and 11', so that the severed end faces of the fiber cannot bear against one another. When the fiber has been broken as described above, the units 2 and 4 are returned to their open position by means of the levers 5, so that the severed end portion of the fiber OF, can be removed from between the surfaces 11 and 11'.

Two phenomena influence the stress distribution in the notched part of the fiber, as the notch N is moved from point A to point E.

Firstly, the pulling force P1 causes a tensile load on the notched part of the fiber as it slides between the strips 8 and 8'. The tensile load and the resulting stress in the fiber increase gradually from point A (start of movement of the fiber) up to point E (the break location of the fiber).

Secondly, due to the bending force, the compressive stress in the upper part of the notched part of the fiber, that is say in the vicinity of the notch N, and the tensile stress in the lower part of the fiber gradually decrease to zero as the notch N moves from point A to point C, at which latter point the compressive and tensile stresses are reversed so that from point C, tensile stress will occur in the upper part of the notched part of the fiber and compressive stress in the lower part thereof, both said stresses increasing until the notch N reaches the break location, namely point E.

The stress distribution in the notched part of the fiber is therefore as shown in FIGS. 2A to 7A. With the stress distribution at the break location, shown in FIG. 7A, there will be little or no mist or hackle on the severed fiber end faces, because the crack propagation speed will not, as mentioned above, exceed the critical limit of about a third of the speed of sound. This stress distribution maintains the crack propagation speed at its correct value to provide severed fiber end faces with mirror type optical surfaces over the whole end face area because said local stress, which increases propagation speed is at a minimum at a given break stress. If the crack propagation speed were to reach a value of about one third of the speed of sound, the fiber surfaces which are being divided as a result of the crack, would be split up by a multiplicity of fissures, causing hackle preceded by mist. As the fiber slides between the resilient strips, torsion resulting from the clamping of the fiber is diminished or even avoided, so that the fracture angle at the severed end faces is consistent whereby undesirable reflection of light back into the core of the fiber where the severed fiber end faces 16, are arranged in abutting, but offset, relationship, as shown in FIG. 8, is limited. In FIG. 8, the fracture angle, which generally does not exceed 1°, is referenced A. The contamination of the end faces 16 by the material of the strips 8 and 8' is reduced by making these strips of a non-fraying material, for example a synthetic felt.

Figure 9:
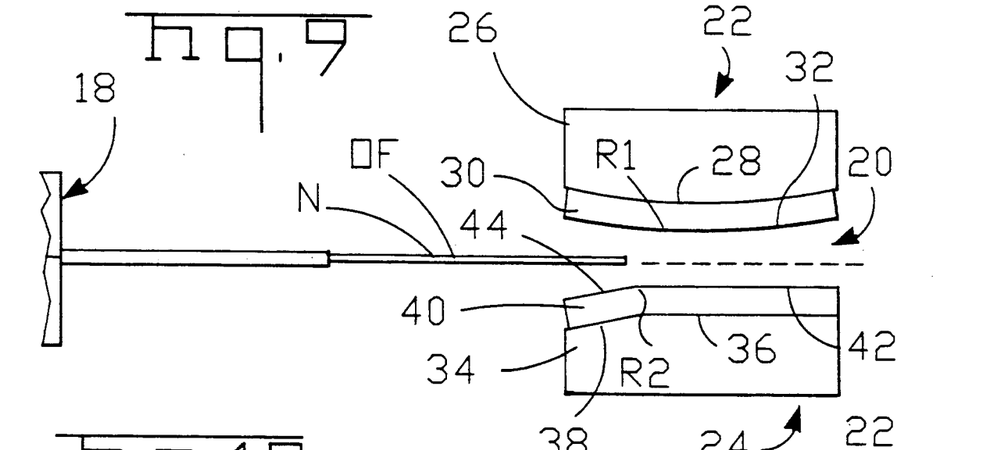
FIGS. 9 to 15 are diagramatic elevational views, with parts omitted, illustrating successive steps in the use apparatus according to a second embodiment of the invention, for breaking an optical fiber.

Reference will now be made to FIGS. 9 to 15. Fiber breaking apparatus according to this embodiment comprises a fiber holder 18 similar to the fiber holder 9 described above, and being similarly mounted. The fiber holder 18 is movable towards and away from a fiber clamp, which is generally referenced 20, and which comprises a movable upper fiber clamping unit 22 and a movable lower fiber clamping unit 24. The unit 22 comprises a rigid block 26, made for example of metal, and having a radiused lower surface 28 which is smoothly bowed towards unit 24 and to which is adhered a resilient strip 30, made of a non-fraying material, for example a synthetic felt, and which follows the contour of the surface 28 so as to have a fiber engaging surface 32 having a radius R1 (FIG. 9). The unit 24 comprises block 34, which, like the block 26, is rigid and may be made of metal. The block 34 has a first rectilinear, horizontal, surface portion 36 which extends from the right hand (as seen in FIGS. 9 to 15), end of the block 34 and merges with a shorter, downwardly chamfered, second surface portion 38 proximate to the left hand (as seen in FIGS. 9 to 15) end of the block 34 and extending obliquely away from the surface 28, so that near the left hand (as seen in FIGS. 9 to 15) end of the fiber clamp 20, the surface 28 and 38 diverge from one another in the direction of the fiber holder 18. Fixedly adhered to the surfaces 36 and 38 and following the contours thereof, is a resilient strip 40 made, for example, of a synthetic felt. The strip 40 thus has a fiber engaging first surface portion 42 following the contour of the surface portion 36 and thus being horizontal and rectilinear, and a second fiber engaging surface portion 44 following the contour of the surface portion 38, the surface portions 42 and 44 cooperating to define a radius R2 (FIG. 9) bowed towards the surface 32, the surface 32 and the surface portion 44 diverging in a direction towards the fiber holder 18. The units 22 and 24 are supported by a clamping frame, not shown, which may be similar to the clamping frame 3 described above, and having similar operating levers.

Figure 10:
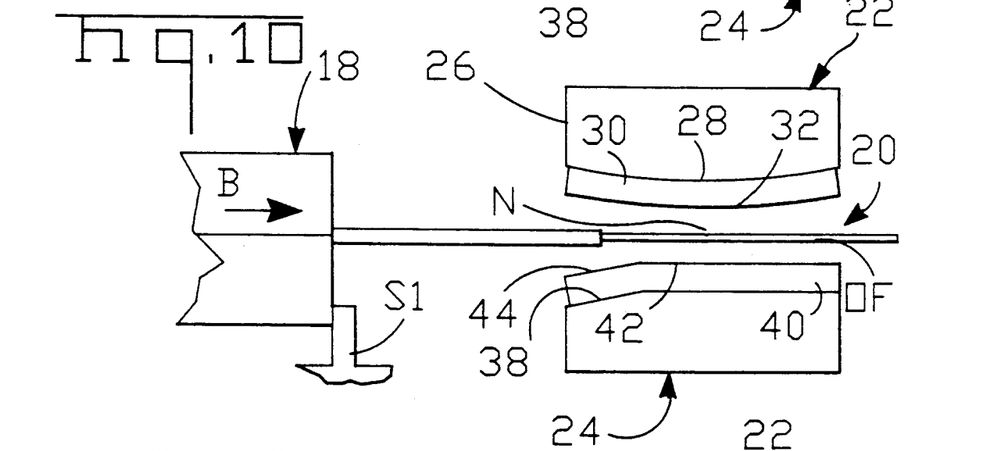
Figure 11:
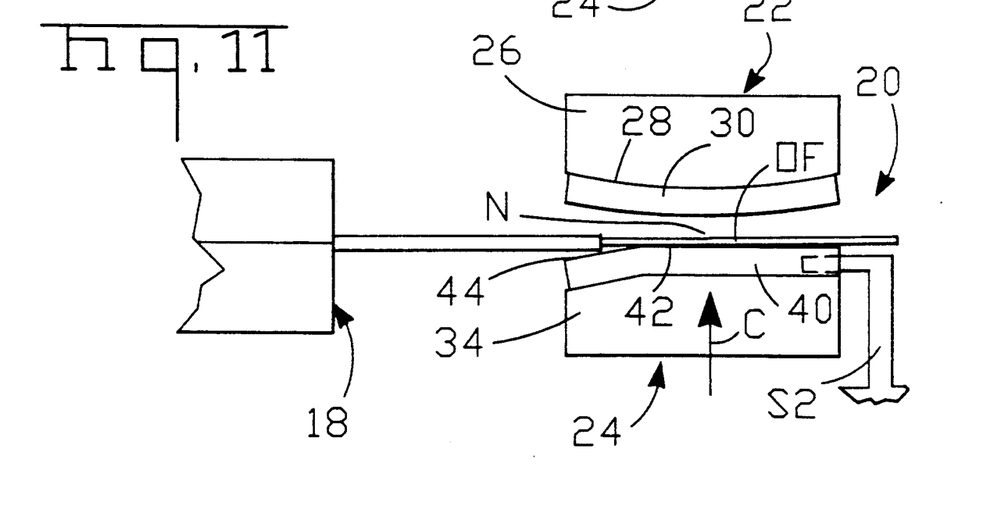

FIG. 9 shows the apparatus in a starting position in which the fiber holder 18, through which an end portion of an indefinite length of optical fiber OF has been passed, has been actuated to clamp the fiber against movement relative to the fiber holder 18. In the starting position, the fiber holder 18 is in a horizontally retracted position remote from the fiber clamp 20, the units 22 and 24 being in an open position so that the surface 32 and the surface portions 42 and 44 of the strips 30 and 40 respectively, are spaced from one another to receive between them, the end portion of the fiber OF. The fiber holder 18 is then advanced, as shown in FIG. 10, from its starting position, towards the fiber clamp 20 in the direction of the arrow B in FIG. 10, to an extent limited by an adjustable fiber holder stop S1, so that the fiber end portion is inserted between the strips 30 and 40, with a notch N, similar to that shown in FIG. 1B, which was previously formed in the fiber end portion, positioned approximately midway between the ends of the strips 30 and 40 as determined by the position of the fiber holder stop S1. The clamping unit 24 is then raised as indicated by the arrow C in FIG. 11 to an extent determined by an adjustable stop S2 so that the fiber end portion is lifted slightly as shown in FIG. 11. The adjustment of the stop S2, is not, however, critical, being of the order of plus or minus 0.2 mm.

Figure 12:
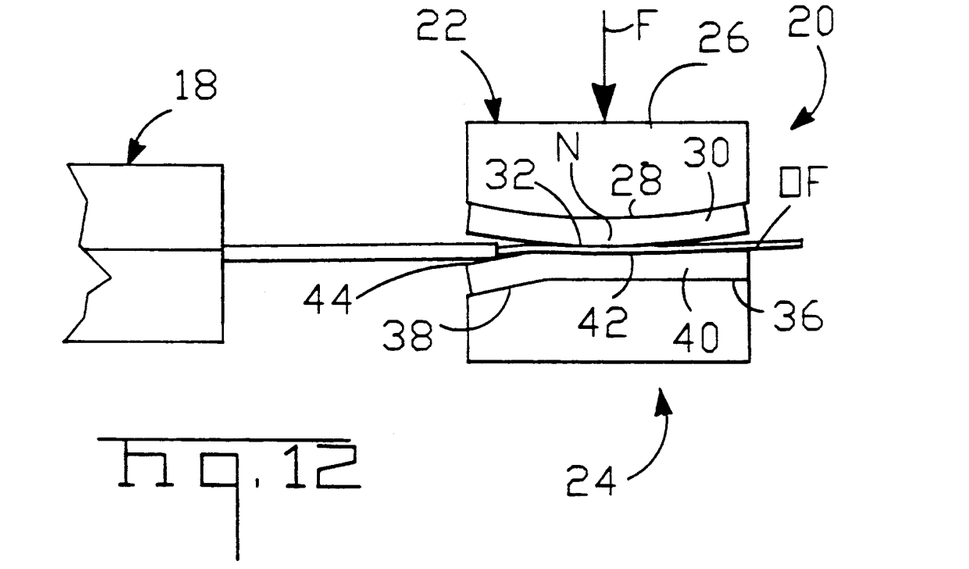

After the unit 24 has been raised as described above, the unit 22 is lowered towards the unit 24, as shown in FIG. 12, by means of said clamping frame to exert clamping force F against the unit 24, which is held by the stop S2 against downward movement. The fiber end portion so clamped, is thereby bent about the notch N, between the surface 32 of the strip 30 and the surface portion 42 of the strip 40, in a sense opposite to the sense of bending that is needed for breaking the fiber end portion, by virtue of a configuration of the surface 32, the notch N being uppermost. The value of the force F is not critical, being, for example, 10 Newtons, plus or minus 2 Newtons.

Figure 13:
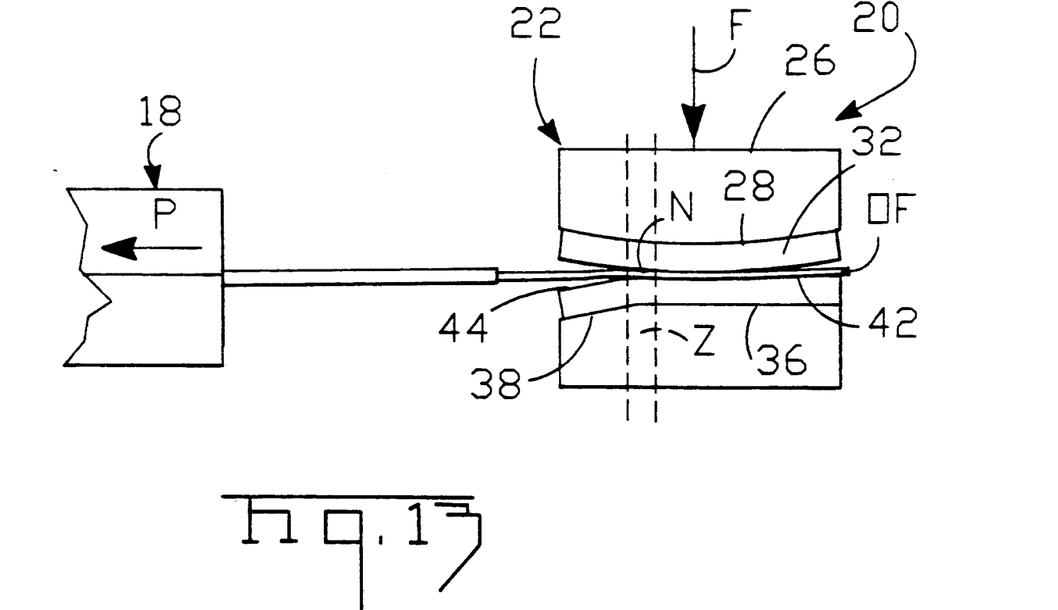

With the fiber end portion clamped between the strips 30 and 40, the fiber holder 18 is retracted as shown in FIG. 13, to apply a pulling force P to the fiber end portion, the value of which force is selected in accordance with that of the force F and the co-efficient of friction between the fiber end portion and the strips 30 and 40, so that the fiber end portion slides therebetween. When the notch N reaches a critical zone Z, where the surface portions 42 and 44 of the strip 40 merge at the radius R2, the fiber end portion is gradually bent about the notch N in said sense of bending that is needed for breaking the fiber end portion, whereby said fiber end portion is broken at the notch N, a correct relationship between the bending and the tensile loads having been achieved (as at point E in FIGS. 7 and 7a).

Figures 14, 15:
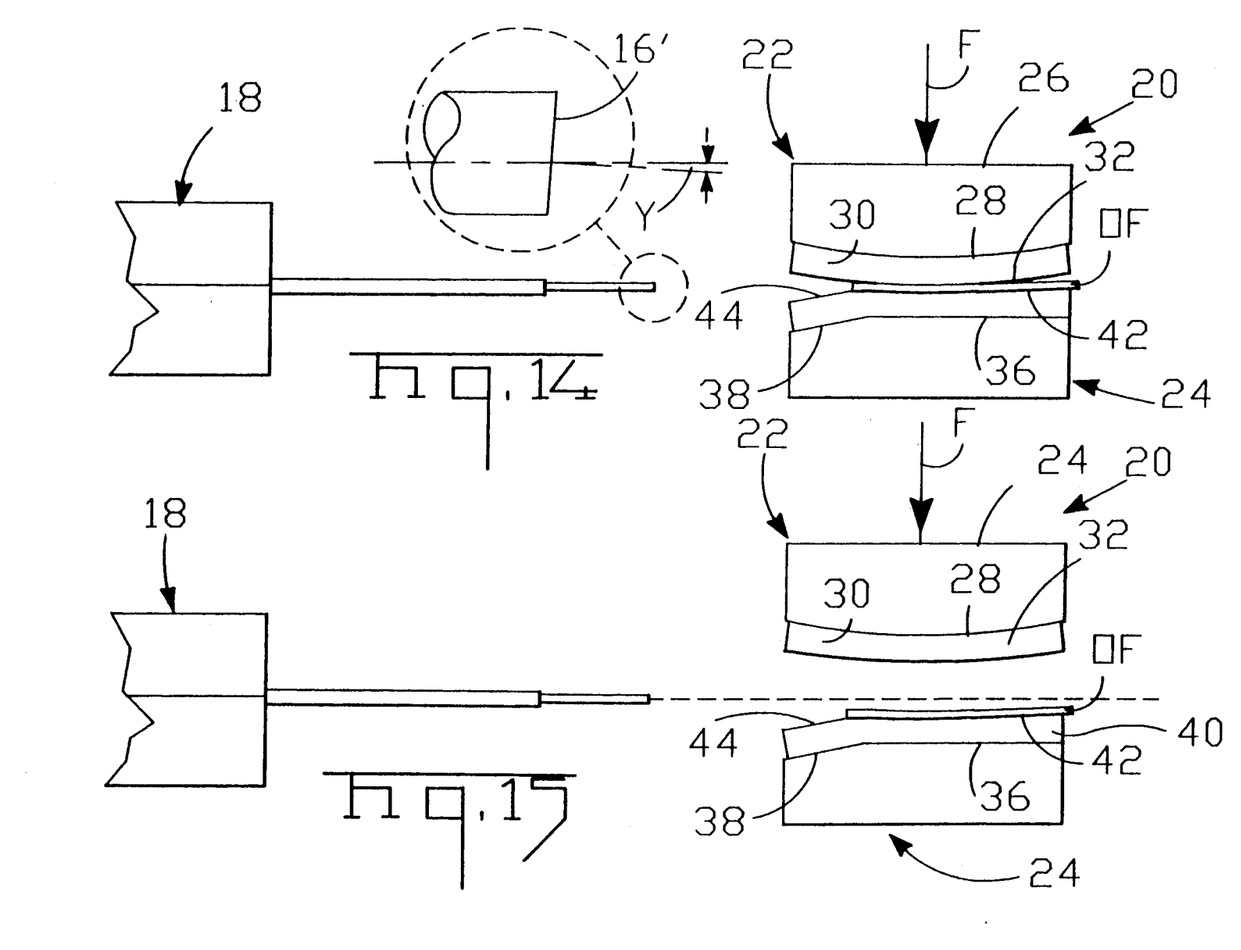

By correct adjustment of the stop S2 and the value of the force F, the fractured end faces of the fiber end portion will each have a mirror type surface extending over its whole area and a small angle of facture Y as indicated diagramatically in respect of the severed fiber end face 16' shown in enlarged form in FIG. 14. The fiber end portion having been broken, the holder 18 is returned to its starting position as shown in FIG. 14 so that the severed end face 16 of the fiber length held by the holder 18 is pulled away from the severed end face of the fiber portion remaining clamped between the strips 30 and 40. The units 22 and 24 are then moved to their open position, as shown in FIG. 15 for a further cycle of operation of the fiber breaking apparatus, which is carried out when the loose fiber portion has been removed from the fiber clamp 20.

During each cycle of operation of the apparatus shown in FIGS. 9 to 15, the stress distribution in the vicinity of the notch N will be substantially equivalent to the stress distribution shown in FIGS. 2A to 7A. In the optical fiber breaking method described above with reference to FIGS. 9 to 15, there are two main parameters, namely the positioning of the unit 24 by the stop S2 and the magnitude of the force F. These parameters are not, however, critical and both can be readily adjusted, the radii R1 and R2 also not being critical. The notch N should, however, be sharp and V shaped.

The method may alternatively be carried out by maintaining the fiber holder 18 against the stop S1 with the force F applied to the units 22 and 24 and moving the fiber clamp 20 away from the fiber holder 18, instead of retracting the latter away from the former. In this case, the fiber will slide between the strips 30 and 40 in exactly the same way as in the method described with reference to FIGS. 9 to 15 and the fiber will break in the same way.

Optical fiber breaking methods and apparatus described above, have the advantages that the severed end faces of the fibers are optically smooth throughout, the facture angles are small and consistent angles, angles of less than 1″ being achievable because little or no torsion is applied to the fiber. At the same time, the parts of the apparatus are simple and easy to adjust and the parameters are not critical. Any little contamination that may be formed on the severed fiber end faces is readily removed by means of adhesive tape.

What is claimed is:

1. A method of breaking an optical fiber at a notch formed therein, the method comprising the steps of;
    clamping an optical fiber between confronting surfaces of first and second resilient members with the notch therebetween, and thereby applying a compressive force to the fiber;
    during the application of the compressive force, bending the fiber about the notch in a first sense tending to close the notch and applying a pulling force to the fiber to cause it to slide axially between said confronting surfaces; and
    during the application of the pulling and the compressive forces, subsequently bending the fiber in a second and opposite sense about the notch to cause a crack to propogate from the notch and across the fiber to break the fiber at the notch.

2. A method as claimed in claim 1, wherein a bending force is applied to the fiber to bend in said first sense about the notch, before applying the pulling force to the fiber.

3. A method as claimed in claim 1, wherein the notch is moved under the action of the pulling force from a start location between said confronting surfaces to a break location therebetween at which location said crack propogates across said fiber, and subjecting the fiber purely to tensile load at a position intermediate said locations.

4. A method as claimed in claim 3, wherein said intermediate position lies midway between said start and break locations.

5. A method as claimed in claim 3, wherein a first bending force is applied to the fiber to subject it to a first bending load in said first sense about the notch, and said bending load is gradually reduced until the notch reaches said intermediate position, whereafter a second bending force is applied to the fiber to subject it to a second bending load to bend it in said second sense about the notch, and said second bending load and said tensile load are gradually increased until the fiber breaks at the notch at said break location.

6. A method as claimed in claim 1, comprising the step of continuing to apply the pulling force to the fiber after the fiber has broken at the notch.

7. A method as claimed in claim 1, comprising the steps of securing the resilient members, which are in the form of strips of non-fraying material, to respective surfaces of a pair of rigid blocks, which surfaces are contoured for the application of said bending forces by said resilient members, locating said blocks in spaced relationship with said strips facing each other, inserting said fiber between the strips, with a length thereof projecting therefrom, moving said blocks relatively towards each other to apply said compressive and bending forces to the fiber and pulling on said length to apply said pulling force.

8. A method as claimed in claim 1, wherein said resilient members are strips of a non-fraying material.

9. A method as claimed in claim 8, wherein said non-fraying material is a synthetic felt.

10. A method of breaking an optical fiber at a notch formed therein, the method comprising the steps of;
compressing an optical fiber and maintaining the fiber under compression whilst bending the fiber about the notch in a first sense tending to close the notch and pulling the fiber to cause it to slide axially whilst under compression; and
subsequently bending the fiber about the notch in a second sense, which is opposite to the first sense, as the fiber slides axially under said compression, so that the fiber breaks at the notch to provide a pair of severed end faces of the fiber.

11. A method as claimed in claim 10, comprising the step of continuing to pull the fiber when it has broken at the notch, to separate said severed end faces from one another.

12. A method as claimed in claim 10, wherein the fiber is compressed between a pair of rigidly supported resilient strips made of a non-fraying synthetic felt.

13. Apparatus for breaking an optical fiber, said apparatus comprising:
first and second fiber clamping units cooperating to provide a fiber clamp and each comprising a block of rigid material having a surface on which is an elongate strip of resilient material;
means supporting said blocks for movement towards and away from each other with said strips in confronting relationship throughout their lengths and for applying a fiber clamping compressive force to said blocks and thus to said strips, to compress a length of optical fiber between them;
a fiber holder spaced from said fiber clamp lengthwise of said strips for gripping said optical fiber at a position back from said length of optical fiber;
means for bringing about relative movement between said fiber clamp and said fiber holder to apply a pulling force to said fiber to cause said length of optical fiber when compressed between said strips, to slide axially between said strips; and
means defined by said strips and spaced lengthwise thereof, for locally bending said length of optical fiber in a first sense and in a second and opposite sense, during the application of said compressive and pulling forces.

14. Apparatus as claimed in claim 13, wherein said resilient strips are of undulating shape, each resilient strip having a pair of oppositely directed and successively arranged arcuate surfaces for co-operation with complementary arcuate surfaces of the other strip, to compress the fiber between them.

15. Apparatus as claimed in claim 14, wherein said strips are curved upwardly and in a first sense on one side of their longitudinal center, which side is nearest to the fiber holder and downwardly in a second sense opposite to said first sense on the opposite side of said longitudinal center.

16. Apparatus as claimed in claim 13, wherein one of the resilient strips has a continuous arcuate surface which is bowed in the direction of the other resilient strip, the other resilient strip having a chamfered surface portion extending obliquely away from the one resilient strip and towards the fiber holder, so that said strips present, proximate to their ends nearest to the fiber holder, opposed surfaces which diverge in a direction towards the fiber holder, said chamfered surface portion of said other resilient strip merging by way of a curved surface which is convex towards said continuous arcuate surface, with a rectilinear portion of said other resilient strip, which portion extends away from the fiber holder on a side of said curved surface remote from the fiber holder.

17. A fiber clamp for use in breaking an optical fiber, said clamp comprising:
first and second blocks of rigid material;
means supporting the blocks for movement towards and away from one another, between an open, fiber receiving position and a closed, fiber clamping position, with confronting surfaces of the blocks facing one another;
an elongate strip of elastomeric material on each confronting surface, the said strips extending through their lengths in confronting relationship; and
confronting surfaces of the blocks having oppositely directed arcuate surfaces thereby to contour said strips for bending an optical fiber clamped between the strips in said clamping position of said blocks and drawn between the strips so as to slide therebetween, in first and second opposite senses.

18. A fiber clamp as claimed in claim 17, wherein said confronting surfaces of the blocks are undulating in shape, each strip thereby having a pair of oppositely directed and successively arranged surfaces for cooperation with complementary arcuate surfaces of the other strip to compress the fiber between said strips.

19. The fiber clamp as claimed in claim 17, wherein one of said blocks has a continuous, arcuate surface which is bowed in the direction of the other block the other block having a chamfered surface portion extending obliquely away from the block so that the blocks present diverging, opposed surfaces, proximate to one of their ends, the chamfered surface portion of said block merging by way of a curved surface which is convex towards said continuous arcuate surface, with a rectilinear surface portion of said other block which extends from said curved surface.

* * * * *